United States Patent Office
3,445,657
Patented May 20, 1969

3,445,657
METHOD FOR EXAMINING SURFACES USING CHEMICAL MIXTURES SELECTED TO PRODUCE KNOWN EFFECTS IF CERTAIN SURFACE CONDITIONS EXIST
John Lynde Anderson, Orlando, Fla., assignor to Cleanometer Corporation, a corporation of Delaware
No Drawing. Continuation-in-part of application Ser. No. 506,566, Nov. 5, 1965, which is a continuation-in-part of application Ser. No. 161,246, Dec. 21, 1961, which in turn is a continuation-in-part of application Ser. No. 78,284, Dec. 27, 1960. This application Jan. 9, 1967, Ser. No. 607,914
Int. Cl. G01n 21/16
U.S. Cl. 250—71
10 Claims

ABSTRACT OF THE DISCLOSURE

Chemical mixtures are produced which are known to alter a surface in certain ways if certain surface conditions exist as, for example, by selective absorption of one of the chemicals by a given contaminant on the surface. An unknown surface is exposed to a given mixture and the modified surface is tested to determine if the given contaminant is present or not. Different mixtures are used to detect the existence or absence of other conditions in a similar manner.

---

This invention relates to a new method of detecting residues on surfaces and more particularly to the detection of non-volatile residues on metal and other surfaces.

Disclosed and claimed herein is the detection of surface conditions in a simultaneous or in a sequential manner through the use of a plurality of different solvents which contain one or more radiochemicals.

This case is a continuation-in-part of my application Ser. No. 506,566, filed on Nov. 5, 1965, which is a continuation-in-part of my application Ser. No. 161,246, filed on Dec. 21, 1961, now U.S. Patent No. 3,297,874, as a continuation-in-part of my application Ser. No. 78,284, filed on Dec. 27, 1960, now abandoned.

In those applications there is disclosed the rapid and quantitative detection of non-volatile contaminants using radiochemicals, and there are described apparatus and compositions for effecting the detection. The disclosures of those applications are incorporated in this by reference thereto. In particular, a process is described for applying a volatile radioactive labeled material to the surface to be examined, effecting partial evaporation under controlled conditions and measuring residual radioactivity due to retention of radiochemical caused by surface conditions such as the presence of contamination, thus effecting a measurement of the surface defect such as contamination. In the present application, relative to a given surface to be examined one uses different radiochemicals in the same or different volatile solvents, and by the proper selections coupled with knowledge of the type of surface being examined one can analyze the surface and draw qualitative and quantitative conclusions. Thus, if one is operating a plant process which is directed to effecting the laying down of a coating on a surface, he can by the process of this invention run accurate checks on the products to assure uniformity in the process and to reject substandard production.

This invention will be further understood by reference to the description and examples given below. Examples I to VII correspond to Examples XII to XVIII of Ser. No. 506,566 and the apparatus used in the examples below corresponds to that described in said application.

EXAMPLE I

Fifty parts of a solution containing 0.1 microcuries of carbon 14 labeled tetrabromoethane (specific activity 85 millicuries per millimole) dissolved in 150,000 parts of trifluorotrichloroethane, removed from a sealed ampule of 3 mm. outside diameter and drawn to a standard capillary on each end, was added to a 1-inch length of a 55 denier acetate rayon yarn containing a standard finish which length was positioned on a stainless steel surface. The addition was such that the fiber surfaces were substantially wetted by the liquid. Immediately after the application of the radiochemical solution, a thin end window Geiger Müller detector, protected with a .15 mil "Mylar" shield, was positioned directly above the wet fibers and a constant flow of clean dry nitrogen passed over the sample and below the surface of the tube protection shield. Following evaporation of the solvent, the rate of evaporation of the radioactive lebeled material was observed by plotting the counts per minute versus time and the areas under the evaporation curve measured by taking the total digital information obtained from the Geiger tube, analysing the data and expressing on a timed basis four sequential areas under the evaporation curve, as explained before. These areas provided the following numbers: 68, 57, 50, 46.

A similar determination made on identical fibers in the absence of finish provided similar number values of 15, 12, 9, 7. The higher numbers are a measure of the amount of finish.

When varying amounts of finish were applied to similar rayon fibers, the numbers obtained were always in a ratio relative to the amount of finish applied. Thus, this procedure can be used as an accurate measure of the amount of finish on fibers.

In a similar experiment the volatile solvent used was cyclopentane and the radiochemical was tridecane-$C^{14}$ with a specific activity of at least 40 millicuries per millimole. Similar, but not identical numerical results were obtained.

In another similar experiment, the radiochemical test solution used consisted essentially of the dimethyl ether of triethylene glycol $C^{14}$ dissolved in the volatile solvent diethyl ether. Similar but not identical results were again obtained. These experiments show that the amount of surface residue on the rayon fibers may be detected by this technique with different radiochemicals.

EXAMPLE II

Using the precision volumetric dispenser described in Ser. No. 506,566, a 20 lambda volume of radiochemical test solution containing one part of tetrabromoethane-$C^{14}$ dissolved in 60,000 parts of trifluorotrichloroethane was added dropwise to a flat, horizontal and clean silicon surface. Following the positioning of a suitable detector above and impingement of dry gas nitrogen onto the surface, the desorption rate from the surface was observed. Expressing the areas under the evaporation curve as a direct function of the digital information, and permitting the prior evaporation of solvent, only background radiation could be detected in four sequential periods. When the same surface was contaminated with 20 micrograms of oil and similarly examined, the numerical expressions were 35, 28, 24 and 22, thus detecting and measuring the contamination.

EXAMPLE III

In an experiment similar to Example I, 1 inch of nylon monofilament having a standard processing finish on its surface was cut into one-eighth inch lengths and the eight pieces were positioned on a sample plate of glass which contained a standard concavity 5 mm. in depth and 25 mm. in diameter for each filament. Then 0.5 ml. of ethyl ether was added to the fiber located in the concavity and the short lengths of fiber were removed with a scrupulously clean pair of forceps. Following evaporation of the ethyl ether, 50 lambda of a solution containing 0.5 microgram of tetrabromoethane-$C^{14}$ in methylene chloride was added dropwise to the resins. Following evaporation of the solvent methylene chloride, the evaporative rate of the radioactive material was determined by passing a controlled flow of pure nitrogen gas at a rate of 1200 ml. per minute over the surface and between the surface and a thin end window G.-M. tube. The various discharges in the G.-M. tube were analyzed by the equipment shown before and the counts per minute plotted against time on a strip chart recorder. The rate of evaporation of the radioactive material thus obtained was significantly lower than the rate observed when the same experiment was carried out on nylon monofilament which had been previously scrupulously cleaned of finish.

EXAMPLE IV

One cubic centimeter of ether containing 10 parts per million of non-volatile residue was evaporated into a glass planchlet similar to that used in Example III, and the non-volatile residue on the planchlet was permitted to resume ambient temperature. Then 8 lambda of a solution containing tetrabromoethane-$C^{14}$ dissolved in trifluorotrichloroethane was added to the planchlet and the volatile solvent evaporated. Subsequent measurement of the rate of evaporation of the radioactive tetrabromoethane-$C^{14}$ from the surface showed the presence of the non-volatile residue previously deposited from the ethyl ether. When the identical experiment was carried out using ethyl ether of scrupulous purity, the observed rate of evaporation was much faster and in fact under the conditions of the experiment, background levels were reached in a few seconds whereas background levels were reached only after several minutes in the case of the deposited residue.

EXAMPLE V

In an experiment similar to Example IV, the amount of non-volatile residue in a series of samples of trichloroethylene which had been obtained from washing the internal surfaces of piping used in pumping hydraulic oils showed that the rate of evaporation increased with the residues laid down from samples taken sequentially. This showed that the first samples contained higher amounts of residual oil and later samples of lower amounts. By using this technique the efficiency of the cleaning steps and materials can be rapidly determined.

EXAMPLE VI

Fifty parts of a solution containing tridecane-$C^{14}$ of specific activity 40 millicuries per millimole in 100,000 parts by weight of pentane gas in added to surface of a tin plate to which had been added by spraying 1.15 grams of oil per 62,000 square inches of surface. Following evaporation of the pentane the rate of desorption of the radioactive material from the surface and from the contaminant was observed by use of a thin end window G.-M. tube and counting system using a steady stream of filtered air as the evaporation agent. The rate of desorption or evaporation from the contaminated surface was significantly lower than when the similar procedure was carried out on previously cleaned tin plate. When the same type of test was run on several different spots on the same piece of tin plate, various described rates of evaporation were observed showing that the spraying technique employed for laying down the oil film did not provide uniform coverage of the surface. Several oils were tested including dioctyl sebacate and cottonseed oil.

In a similar experiment, a solution of tetrabromoethane-$C^{14}$ in trifluorotrichloroethane in 1:60,000 ratio by weight was used to prove the presence of 6 milligrams per square foot of stearic acid on aluminum foil. The evaporation rate was always significantly lowered by the presence of contaminant and the results of several spot tests showed a decided uneveness in amount of stearic acid on the surface.

EXAMPLE VII

Fifty lambda of a solution containing 0.5 micrograms of tetrabromoethane-$C^{14}$ in trichlorotrifluoroethane and substantially no non-volatile residue was added, from a previously sealed 2 mm. (outside diameter) glass tubing, in which the solution formed a steady miniscus when inverted by breaking off first one end of the tube and then a second end, to a concavity in a stainless steel planchlet on which had been deposited previously 10 micrograms of linseed oil followed by curing in an air oven for twenty minutes of 100° C. The results of observing the rate of evaporation using the equipment described previously showed values of 110, 92, 84, and 76 whereas the same determination in the absence of the linseed oil showed values of 60, 15, 7 and 4, respectively. When the test plate was cleaned in an ultrasonic cleaner for a period of eight minutes using trifluorotrichloroethane as solvent, a subsequent test showed that substantially all of the linseed oil had been removed when the values of 56, 14, 8, and 5, respectively were obtained. These values were obtained using the apparatus of the invention described in Ser. No. 506,566.

When the same test was performed with another ultrasonic cleaner, the results following the eight minute cycle showed values of 70, 24, 13 and 8, showing that the second ultrasonic cleaner did not function as well as the first one.

When the same test was performed with yet another ultrasonic cleaner, the results showed that this third cleaner barely cleaned the surface at all; that is, the results following cleaning were 90, 78, 69, and 62.

Thus, the method of observing comparative rates of evaporation on previously similarly contaminated surfaces permits an accurate and instrumental evaluation of the efficacy of ultrasonic cleaners.

In still another experiment a mixture of decyl bromide-1-$Br^{82}$ and nonanol-1-$C^{14}$ is used as the radioactive element in order to effect preferential pick-up by contaminants varying in chemical composition. It is noted that this combination works well with contamination containing both carbohydrates and hydrocarbonaceous materials. Similarly, other mixtures of contaminants are treated with radioactive materials purposely compounded in mixtures to insure good pick-up by each individual contaminant in the composite impurity.

EXAMPLE VIII

Three polished stainless steel plates (I, II and III) are cleaned and protected from inadvertant contamination. Plate I is maintained as a control. To plates II and III Johnson's J Wax, a proprietary wax system, is applied uniformly and buffed. Plate II is then maintained as a wax control. After application and buffing of the wax, the plate III surface is extracted exhaustively with pentane, a low boiling solvent, thereby removing the pentane-soluble wax components.

These plates, positioned horizontally, are then analyzed by placing on each a 20 lambda (0.020 ml.) amount of a standard test solution containing a radioactive labeled material (tetrabromoethane-$C^{14}$, 0.05 microcurie, specific activity 85 millicuries per millimole) dissolved in 100,000 parts of a highly purified (less than 1 p.p.m. non-volatile residue) low boiling solvent (trifluorotrichloroethane) for the radiochemical. Following deposition of the test solution, a suitably protected thin-end-window G.-M. tube is positioned just above the test area, and a metered flow of nitrogen gas maintained between the test surface and the thin-end-window G.-M. tube in order to establish constant evaporative conditions. The reduction of the activity with time is established and is measured as is described in my copending application Ser. No. 506,566. The 14-second area accumulations starting after a 6-second time delay have values as follows:

TABLE A

| | A | B | C | D |
|---|---|---|---|---|
| Plate: | | | | |
| I | 32 | 37 | 3 | 2 |
| II | 35 | 45 | 7 | 3 |
| III | 37 | 65 | 16 | 4 |

When these tests are repeated, using the same radioactive labeled material dissolved in the same concentration of highly purified cyclopentane as the solvent for the radiochemical, the following results are observed:

TABLE B

| | A | B | C | D |
|---|---|---|---|---|
| Plate: | | | | |
| I | 51 | 7 | 3 | 3 |
| II | 66 | 72 | 37 | 24 |
| III | 66 | 18 | 4 | 3 |

Since the rate of evaporation is an inverse function of the values of these numbers, particularly in the B and C groupings, it is apparent that the evaporative response in the case of the Plate I shows rapid and complete evaporation (background is 2-3). In the case of Plate II, trifluorotrichloroethane (Table A) does not dissolve an appreciable amount of the wax so that the test based on this solution appears similar though not identical to the test on the clean surface. Cyclopentane, on the other hand, dissolves the hydrocarbonaceous components of the wax system and the evaporative response based on the cyclopentane system is very slow (Plate II, Table B) due to the dissolving of the cyclopentane and radiochemical on the wax. In the case of Plate III in Table A, evaporation from the previously extracted wax system shows significant residues as tested by the radiochemical dissolved in trifluorotrichloroethane (that is the rate is slow due to the solubility of the fluorocarbon in the non-hydrocarbonaceous residue), but when the same radiochemical is used in cyclopentane, a much faster evaporation takes place because the cyclopentane is insoluble in the non-hydrocarbonaceous residue.

Thus, the profound effect of changing solvent as well as preliminary extraction of the surface residue is observed. In the wax control plate (II), the evaporative rate observed for the cyclopentane test solution shows the presence of massive amounts of soluble residue, whereas with the other solvent test solution, the presence of the hydrocarbonaceous wax component significantly masks the effect of the residue.

EXAMPLE IX

Kraft paper, treated with perfluorocarbon acids (5 lbs. per ton on one side—Sample 1, and 5 lbs. per ton on each side—Sample 2), is examined with three test solutions containing radiochemical and solvent mixtures.

Samples of each type of paper are placed in a flat horizontal position and the test solution (0.020 ml.) added. Following positioning of the detector, the evaporative rates are determined numerically by analyzing sequential areas (A, B, C, D) under the evaporation curve using a six-second time delay before start of sequential area determinations, nitrogen gas flow at 10 ml./sec. temperature at 82° F., and fixed and standard geometry. The three test solutions are:

Tetrabromoethane-$C^{14}$ in trifluorotrichloroethane (TBE*/TFTCE)
Tetrabromoethane-$C^{14}$ in cyclopentane (TBE*/CP)
Tridecane-$C^{14}$ in cyclopentane (TD*/CP)

Using the test techniques of Example I, values are obtained as follows:

| | | | | | |
|---|---|---|---|---|---|
| Sample 1 | 29 | 25 | 24 | 23 | TBE*/TFTCE |
| Sample 2 | 31 | 29 | 24 | 22 | |
| Sample 1 | 41 | 24 | 21 | 20 | TBE*/CP |
| Sample 2 | 92 | 39 | 32 | 31 | |
| Sample 1 | 18 | 10 | 9 | 7 | TD*/CP |
| Sample 2 | 68 | 21 | 13 | 10 | |

TBE*/TFTCE does not differentiate the two papers.
TBE*/CP markedly differentiates the levels of the paper additives.
TD*/CP markedly differentiates the levels of paper additives.
TBE* is significantly more strongly retained that is TD* by the fluorocarbon additives, background being 2-3. Proper selection of test solutions and knowledge of the type of paper being analyzed permit detailed qualitative and quantitative conclusions based on simple tests.

EXAMPLE X

Using the technique described in Example I, metered quantities containing 0.05 microcurie of carbon-14 labeled tetrabromoethane-$C^{14}$ (specific activity 85 millicuries per millimole) dissolved in 100,000 parts of trifluorotrichloroethane are added to a series of epoxy coated tin plates, which have been cured, that is cross-linked, for varying periods of time. The rate of evaporation is observed to be a function of the degree of cure or cross-linking of the epoxy system: that is, the greater the cure, the faster the rate of evaporation.

Using similarly (partially to completely) cured epoxy systems on tin plate, and spraying a standard amount of acetone onto the surfaces prior to deposition of the test solution, the test sensitivity is increased since the rate of evaporation of the acetone treated non-cured systems or partially cured systems is slower than the rate observed for the similar systems which had not been sprayed with acetone. This example shows the effect of a non-radioactive solvent used to increase the sensitivity or to increase the meaningfulness of this particular test.

The use of different radioactive labeled materials and/or different low boiling solvents may be carried out simultaneously or sequentially and qualitatively the nature of the residue determined as well as quantitatively the amount of the residue determined. In the sequential technique of this invention it is oftentimes of advantage to use adjacent spots on the surfaces for the sequential tests rather than the same spot. The use of the same spot sometimes causes erroneous readings since the effect of the first test is to change the resulting surface to a small degree and thereby effect the validity of the second test run thereon.

From the above it can be seen that in my invention a volatile radioactive labeled compound is used which preferably is compatible and miscible with the type of contaminant which it is desired to detect and to measure, and in general it is preferred that the radioactive labeled compound is chemically inert, with both the surface and with the contaminant. In the event that the radioactive labeled compound selected is, in fact, reactive with the contaminant, it is necessary that the compound will be much less reactive with the surface itself so that after the evaporative phases of my invention, a difference in radioactivity will be observed. In addition, the labeled compound selected for a given surface or combination of surfaces will have a volatility which is normally less than the volatility of the particular solvent employed, if any. In any event the volatility of the radioactive labeled compound is such as to permit substantially complete evaporative conditions even when the surface is contaminated. Under these conditions the detection of residual radioactivity on the surface constitutes a positive demonstration that the contamination existed prior to the application of the test solution of the radiochemical.

The amount of radioactivity which is detectable is in general proportional to the amount of contamination which was originally present when the process of my invention is employed. The physical state and the chemical nature of the contamination also affect to some degree the amount of residual activity retained under the evaporative conditions. A small amount of contamination will cause the retention of only a small amount of residual activity whereas a large amount of chemically similar contamination will cause the retention of a relatively large amount of residual activity. The rate at which the solvent, if any, and the radioactive labeled compound are evaporated is not highly significant; however, the evaporative conditions are normally continued until substantially all of the solvent and the radioactive material would evaporate if no contaminant on the surface were originally present; that is, control conditions are met.

The type of contamination which is detected by my inventive process is that which is often found on metal surfaces. Such contamination may arise from cutting or threading oils, from greases and protective hydrocarbons, and in other ways. The particular radioactive labeled compound employed will determine in part the efficacy of the detection process and it is preferred that radioactive compounds be used which are compatible with hydrocarbons and other organic contaminants.

The particular radioactive labeled material employed in my invention is selected also for the type and energy of radiation omitted, for the chemical compatibility which the solvent used, if any, for the ability to be adsorbed on the surface of or adsorbed within the contaminant and for such volatility as to enable substantially complete evaporation within a reasonable time from a previously scrupulously clean surface. The radioactive labeled compound is made radioactive by the presence of alpha, beta, or gamma emitting radioisotopes. In general for measuring the radioactivity immediately adjacent to the contamination, compounds containing soft beta or gamma emitters are used while compounds containing hard beta or gamma emitters are required when the radioactivity is detected through a metal surface.

A preferred class of radioactive labeled compounds consists of organic compounds which are labeled with at least one of the group of beta emitters consisting of carbon-14, sulfur-35, phosphorous-32, chlorine-36 and hydrogen-3. Another preferred class of radioactive labeled compounds consists of organic derivatives containing one or more strong gamma emitter.

Some typical classes of volatile radioactive labeled compounds which are well suited for my invention are the hydrocarbons decane-$C^{14}$, tridecant-$C^{14}$, Decalin-$C^{14}$, isoctane-$C^{14}$, and nonane-$H^3$; halohydrocarbons such as decyl bromide-$C^{14}$, tetrachloroethylene-$C^{14}$, trichloroethylene-$C^{14}$, hexachloropropene-$C^{14}$, carbon tetrachloride-$C^{14}$, chloroform-$C^{36}$, and difluorotetrachloroethane-$C^{14}$, ethers and thioethers such as ethylene glycol diethylether-$C^{14}$, and dibutylthioether-$S^{35}$; and phosphorous compounds such as tripropylphosphine and phosphorous tribromide labeled with phosphorous-32.

The radioactivity in my inventive process is detected by means of any suitable detector of radiation. For most purposes a Geiger-Müller tube and associated equipment is acceptable and convenient. Portable instruments used to detect radioactivity inside of long and complex metal tubes have had to be designed for this purpose.

The surfaces examined by my inventive process may be almost any material used in commerce for construction of plates, pipes, valves, tanks, flanges, and the like. For example, metal, glass, fused ceramics, and plastic surfaces are all satisfactory and may be examined for the presence of contaminants. In general the more porous the surface (that is, the greater the surface area) the less the differentiation between surface and contaminant with respect to retention of radioactive labeled material and therefore the less positive the absolute identification of contaminant. To illustrate, oil or grease is very readily detected on polished stainless steel but oil or grease on a surface prepared by compressing finely divided carbon black is more difficult to detect since the carbon black with a relatively high surface area adsorbs the radioactive labeled material in much the same way as the contaminant adsorbs it and the rate of evaporation from the compressed carbon black is nowhere near as rapid as from polished metal or glass. But by proper reference to the control the presence of the contaminant is detected as well as a fairly quantitative measurement of it. Knowing the nature of the surface, the operator of this invention will proceed accordingly.

It is apparent from this discussion that materials such as sand or finely divided iron oxide may be readily detected on the surface of machined steel using my invention provided a radioactive labeled material is selected which is adsorbed more strongly by contaminants, such as iron oxide, than by the machined surface, since the evaporative rate from the iron oxide is less than that from the machined steel, other conditions such as temperature and flow of gas over the surfaces being held constant.

Solvents such as tetrachloroethylene and low boiling petroleum ether are not an essential part of this invention in its broadest aspects although in preferred embodiments solvents are used. Solvent functions are to increase the solubility, the rate of solution, and/or the adsorption or absorption of the radioactive labeled compounds on or in the contaminant to be detected. In addition the presence of the solvent vapor tends to increase the efficiency of the deposition on all surfaces. Many solvents may be used such as tetrachloroethylene, low boiling petroleum ether, butanol, perfluorocyclobutane, methylene chloride, ethanol, acetone, formic acid, ethyl ether, and the like. Solvents with boiling points at least 100° C. less than the boiling points of the particular radioactive labeled material are used in order that appreciable residues of the radioactive labeled material are left over after substantially complete evaporation of the solvent.

In general, it is preferred to use a radioactive labeled material which has a boiling point at least 100° C. higher than the solvent boiling point in order to insure that, following the evaporation of the solvent, sufficient radioactive labeled material is left behind for ready detection particularly in the case of previously scrupulously cleaned surfaces. Therefore, materials with boiling points in excess of 100° C. are preferred when low boiling solvents are employed and in excess of 130° C. when higher boiling solvents are employed. When no solvents are employed in my inventive process, the boiling point of the selected radioactive labeled material should be sufficiently high so that facile determination of the rate of evaporation is possible.

When two or more types of contaminants may be encountered, it is of advantage to use two or more particular radioactive labeled materials of such a nature that one is absorbed more strongly by a first type of contaminant and so forth. Thus, when attempting to locate and detect contaminants such as hydrocarbon grease and proteinaceous material, radioactive labeled materials such as 1,1,2,2-tetrabromoethane-$Br^{82}$ and iodoacetic acid-$I^{131}$ may be used simultaneously in the same solvent or dispersant system. Also, the rate of evaporation of each may be determined independently of the other by means of suitable detection devices such as scintillation or solid state detectors coupled with channel analyzers so that the individual radiations of different energy levels are determined separately. This technique permits the detection of the location, the type, and the relative amount of each contaminant quickly and conveniently. Other counters which can be used include the Geiger counter and the proportional counter for beta and gamma rays. These various counters may be used externally or as probes moving within the enclosures being tested.

Since my inventive process depends on adsorption or adsorption by the contaminant of the radioactive labeled material, it is important to insure that mixing of the radioactive labeled material with the contaminant be encouraged through use of the proper solvent, through providing a long enough time of contact prior to the encouragement of the evaporation, and by selecting the proper radioactive labeled material for the type of contaminant it is desired to detect.

It is to be appreciated that all of the disclosures of Ser. No. 78,284; Ser. No. 161,246; and Ser. No. 506,566 are, for convenience, not repeated here and that any desired are incorporated by reference.

While the invention has been disclosed herein in connection with certain embodiments and certain structural and procedural details, it is clear that changes, modifications or equivalents can be used by those skilled in the art; accordingly, such changes within the principles of this invention are intended to be included within the scope of the claims below.

I claim:

1. A process for examining a surface which comprises contacting the surface to be examined with a mixture of at least two different chemicals which are selected to produce certain results if given surface conditions exist and at least one of which alters the initial characteristics of the surface by being absorbed by said surface or materials on it; effecting at least partial evaporation of said chemicals; and measuring the amount of at least one of the chemicals affected by said evaporation to determine if said surface conditions did in fact exist.

2. A process in accordance with claim 1 which includes the step of comparing the amount measured to a control surface.

3. A process in accordance with claim 1 in which one of said chemicals is a solvent for material initially a part of said surface.

4. A process in accordance with claim 1 in which one of said chemicals is a radiochemical.

5. A process in accordance with claim 4 in which said radiochemical contains radioactive carbon.

6. A process in accordance with claim 1 which includes a third chemical.

7. A process in accordance with claim 6 in which one of said chemicals is a radiochemical and the other of said chemicals are solvents effecting different dissolving effects.

8. A process in accordance with claim 6 in which two said chemicals are different radiochemicals.

9. A process in accordance with claim 1 which is carried out in a simultaneous manner.

10. A process in accordance with claim 1 which is carried out in a step-wise manner.

References Cited

UNITED STATES PATENTS

| | | |
|---|---|---|
| 2,878,392 | 3/1959 | Polito. |
| 2,968,733 | 1/1961 | Dvorkovitz et al. |
| 3,135,865 | 6/1964 | Reed et al. _____ 250—106 |

ARCHIE R. BORCHELT, *Primary Examiner.*

U.S. Cl. X.R.

250—83, 106

UNITED STATES PATENT OFFICE
CERTIFICATE OF CORRECTION

Patent No. 3,445,657                                                May 20, 1969

John Lynde Anderson

It is certified that error appears in the above identified patent and that said Letters Patent are hereby corrected as shown below:

Column 1, line 39, ", filed on Nov. 5, 1965," should read -- , filed on Nov. 5, 1965 and now U.S. Patent No. 3,412,247 --. Column 2, line 2, "carbon 14" should read -- carbon-14 --; line 19, "lebeled" should read -- labeled --; line 42, "$C^{14}$" should read -- C-14 --. Column 3, line 48, "samples of lower" should read -- samples lower --; line 55, "gas in added" should read -- is added --; line 67, "Described" should read -- decreased --. Column 4, line 15, "twenty minutes of 100° C." should read -- twenty minutes at 100° C. --. Column 6, line 18, "that" should read -- than --; line 67, "phases" should read -- phase --. Column 7, line 32, "omitted" should read -- emitted --; same line 32, "which" should read -- with --; line 54, "tridecant-$C^{14}$, Decalin" should read -- tridecane-$C^{14}$, decalin --. Column 9, lines 3 and 4, "adsorption or adsorption" should read -- adsorption or absorption --.

Signed and sealed this 5th day of May 1970.

(SEAL)
Attest:

EDWARD M. FLETCHER, JR.
Attesting Officer
                                        WILLIAM E. SCHUYLER, JR.
                                        Commissioner of Patents